(12) United States Patent
Ryan, Jr. et al.

(10) Patent No.: US 7,353,213 B2
(45) Date of Patent: Apr. 1, 2008

(54) SYSTEM AND METHOD FOR PREVENTING DUPLICATE PRINTING IN A WEB BROWSER

(75) Inventors: Frederick W. Ryan, Jr., Oxford, CT (US); Bradley R. Hammell, Fairfield, CT (US); Anuja S. Ketan, Oxford, CT (US)

(73) Assignee: Pitney Bowes Inc., Stamford, CT (US)

( * ) Notice: Subject to any disclaimer, the term of this patent is extended or adjusted under 35 U.S.C. 154(b) by 594 days.

(21) Appl. No.: 10/707,508

(22) Filed: Dec. 18, 2003

(65) Prior Publication Data

US 2005/0065892 A1    Mar. 24, 2005

Related U.S. Application Data

(60) Provisional application No. 60/481,401, filed on Sep. 19, 2003, provisional application No. 60/481,402, filed on Sep. 19, 2003.

(51) Int. Cl.
*G06F 17/00* (2006.01)
*G07B 17/02* (2006.01)

(52) U.S. Cl. ...................... 705/401; 705/408

(58) Field of Classification Search ............ None
See application file for complete search history.

(56) References Cited

U.S. PATENT DOCUMENTS

| | | | |
|---|---|---|---|
| 5,168,444 A | 12/1992 | Cukor et al. | |
| 6,032,138 A | 2/2000 | McFiggans et al. | |
| 6,064,995 A | 5/2000 | Sansone et al. | |
| 6,144,950 A * | 11/2000 | Davies et al. | 705/401 |
| 6,182,565 B1 | 2/2001 | Takayama et al. | |
| 6,204,851 B1 * | 3/2001 | Netschke et al. | 345/419 |
| 6,233,565 B1 * | 5/2001 | Lewis et al. | 705/35 |
| 6,249,777 B1 | 6/2001 | Kara et al. | |
| 6,389,458 B2 * | 5/2002 | Shuster | 709/213 |
| 6,430,543 B1 | 8/2002 | Lee et al. | |
| 6,592,027 B2 | 7/2003 | Kovlakas | |
| 6,687,684 B1 | 2/2004 | Whitehouse et al. | |
| 2001/0030232 A1 | 10/2001 | Piatek | |
| 2002/0012445 A1 | 1/2002 | Perry | |
| 2002/0012448 A1 * | 1/2002 | Perry | 382/100 |
| 2002/0035547 A1 * | 3/2002 | Bleumer | 705/62 |
| 2002/0110397 A1 * | 8/2002 | Bussell | 400/104 |

(Continued)

FOREIGN PATENT DOCUMENTS

EP    1014318 A2    6/2000

(Continued)

OTHER PUBLICATIONS

Anupam, Vinod, Security of web browser scripting languages: vulnerabilities, attacks, and remedies, Jan. 1998, USENIX Association, vol. 7 SSYM'98.*

*Primary Examiner*—John W. Hayes
*Assistant Examiner*—Fadey S Jabr
(74) *Attorney, Agent, or Firm*—George M. Macdonald; Angelo N. Chaclas (57) ABSTRACT

A method and system for processing shipping labels having postage is described. In one configuration a hidden frame in a secure browser window is used to control printing of an actual shipping label while allowing unlimited sample printing of a sample shipping label having sample postage indicia.

25 Claims, 7 Drawing Sheets

U.S. PATENT DOCUMENTS

2003/0097306 A1    5/2003  Baucher et al.
2003/0101147 A1    5/2003  Montgomery et al.
2004/0044586 A1    3/2004  Gullo et al.
2005/0278266 A1*  12/2005  Ogg et al. .................. 705/408

FOREIGN PATENT DOCUMENTS

WO          03/42796 A2    5/2003

* cited by examiner

SYSTEM AND METHOD FOR PREVENTING DUPLICATE PRINTING IN A WEB BROWSER

CROSS REFERENCE TO RELATED APPLICATIONS

This application claims priority under 35 U.S.C. section 119(e) from Provisional Patent Application Ser. No. 60/481,401, filed Sep. 19, 2003, entitled System And Method For Preventing Duplicate Printing In A Web Browser, which is incorporated herein by reference in its entirety. This application claims priority under 35 U.S.C. section 119(e) from Provisional Patent Application Ser. No. 60/481,402, filed Sep. 19, 2003, entitled Fraud Detection for Postage Systems, which is incorporated herein by reference in its entirety.

BACKGROUND OF INVENTION

The illustrative embodiments described in the present application are useful in systems including those for providing funds accounting and evidencing and more particularly are useful in systems including those for providing for accounting of postage and evidence of postage.

Funds accounting, storing and dispensing systems are potential targets for fraud because they store funds. Certain funds systems are regulated and are typically required to exhibit some level of security capability to prevent or dissuade fraudulent activity. Such systems may also provide some forensic evidence to assist in tracking any fraud that is perpetuated.

For example, postage meters approved by the United States Postal Service (USPS) must exhibit certain security capabilities in order to be approved for use. Many postage meters in the United States provide funds accounting such that a source of funds is debited when postage is prepaid before being placed into the mail stream. Additionally, many postage meters provide proof of the postage payment in the form of printed indicia placed on the mail piece, typically on the upper right hand corner of an envelope. In a postage system that utilizes prepaid funds such as the USPS, a postage meter may account for funds by providing an ascending register to track money spent, a descending register to keep track of available funds and a piece count register to track total number of mail pieces franked. Certain other postal systems utilize post-paid postage wherein a postage meter may incorporate credit accounting features.

Mailing machines including postage meters are commercially available from Pitney Bowes Inc. of Stamford, Connecticut. Additionally, the CLICKSTAMP™ Online system is available from Pitney Bowes Inc. for printing CLICKSTAMP™ Internet Postage. The program is a heavy client architecture that includes access to a virtual postage meter assigned to the postage meter license of the customer. The program must be installed on the user computer as an application and is typically shipped stored on a CD-ROM. The customer may download the software, but such a download may take several minutes using a typical modem dial-up Internet connection.

A reference directed to Instant Online Postage is described in U.S. Pat. No. 6,619,544 issued to Bator, et al. on Sep. 16, 2003 and is incorporated herein by reference in its entirety.

The United States Postal Service published a draft specification entitled Performance Criteria for Information-Based Indicia and Security Architecture for Open IBI Postage Evidencing Systems (PCIBI-O), dated Feb. 23, 2000.

Postage meters may be characterized as operating in an open meter manner or a closed meter manner. A typical closed system postage meter includes a dedicated printer for printing evidence of postage dispensed and accounted for by the meter. A typical open system meter may utilize a general-purpose printer. Postal funds are often stored in a postal security device (PSD) that may employ a secure accounting vault. The typical postage meter user leases a postage meter and registers that postage meter with the United States Postal Service (USPS).

Virtual postage meters such as the CLICKSTAMP™ Online (CSO) system are available, and exist as accounts at a data center with a user having a postage meter license to use a corresponding virtual postage meter by remote access. A remote virtual postage meter account and remote cryptographic processors are utilized to produce indicia information that is used by the user's local processor to print postage indicia. As described more fully in the incorporated references, the CSO virtual postage meters utilize the Information-Based Indicia Program (IBIP) indicium that is a distributed trust system. The user fills the postage vault with funds and then dispenses the funds as postage by applying printed postage indicia to mail pieces that are then placed in the mail stream. The CSO user has a virtual postage meter account with a unique serial number and that account is associated with a postage meter license obtained under authority of the USPS.

A reference directed toward reissuing digital tokens in an open metering system is described in U.S. Pat. No. 6,157,911, issued to Cordery, et al. on Dec. 5, 2000 and incorporated herein by reference.

A reference directed toward preventing fraudulent printing of a postage indicia displayed on a personal computer is described in U.S. Pat. No. 5,988,897, issued to Pierce et al. on Nov. 23, 1999 and incorporated herein by reference. The Pierce system describes determining whether the output device is a window or a printer and choosing the appropriate indicium to render based upon that determination. Accordingly, a screen print function would print the sample indicium. Accordingly, a downloaded application could hook into the operating system printing subsystem so that the user would not be able to print multiple copies of an indicia. Commonly owned, co-pending patent application Ser. No. 09/451,598, filed Nov. 30, 1999 directed toward a method for preventing the duplicate printing of an IBIP indicium is incorporated herein by reference.

Commonly owned, co-pending patent application Ser. No. 09/952,543, filed Sep. 14, 2001 and entitled Method And System For Optimizing Refill Amount For Automatic Refill Of A Shared Virtual Postal Meter, is incorporated herein by reference. Commonly owned, copending patent application Ser. No. 10/012,960, filed Nov. 5, 2001 and entitled Method And System For Secure Printing Of Indicia Via A Web Based Browser, is incorporated herein by reference.

Several types of value transfer systems are used in postage payment systems in general and by the USPS in particular. For example, stamps may be purchased and then utilized to pay for postage. A permit system may be used in which a mailer established an account with the USPS and then uses a manifest system to account for postage. Additionally, a meter system may be used. A postage meter is loaded with an amount of postage value that is then dispensed by printing postage indicia on mail pieces.

In another payment model, a broker may act on behalf of a customer to pay the postage due to the carrier such as the USPS as long as the USPS is convinced that the system is sufficiently secure. The broker is then responsible for paying the postage. In such a system, the user does not require a postage meter license. The broker obtains a postage meter license for the broker data center and obtains location information from the users. The broker then sends the location information such as the zip code to the USPS with the mail piece data. The broker is then responsible for identifying a particular package sender if required by the USPS.

SUMMARY OF INVENTION

The present application describes systems and methods for preventing duplicate printing of data. In one embodiment, a postage dispensing system comprises a web browser that receives an HTML page having at least one visible frame and at least one hidden frame. The visible frame contains a sample postage label and two print buttons that may be selected by the user. The first print button is marked sample and causes the sample postage label to print when selected. This button may be selected as often as the user likes.

The hidden frame contains the actual shipping label with postage. The second print button may be selected only a certain number of times such as twice. When first pressed, the user is prompted to determine whether the label was successfully printed. If not, the user is given one more chance. The success or failure of the print step is logged. After two failed print attempts, the user is offered a refund.

In another embodiment, the sample postage is identical to the actual postage except for the bar code portion of the indicia that is obscured. In another embodiment, the buttons are coded in JavaScript. In yet another embodiment, a postage broker sends a markup language file representing a shipping label to a user, wherein the markup file includes a hyperlink to a postage indicia generated by and hosted by a separately located virtual postage meter.

DETAILED DESCRIPTION

The present invention is described with reference to the CSO Internet Postage System. It will be understood that the present invention is suitable for use with any virtual meter system.

As described herein, illustrative embodiments of a postage dispensing system are shown. In one embodiment, a postage customer uses a web browser to receive a markup language page having at least one visible frame and at least one hidden frame. In an alternative, part of the hidden frame could be visible to the user such that at least part of the hidden frame is hidden from the user. The visible frame contains a sample postage label and two print buttons that may be selected by the user. The first print button is marked sample and causes the sample postage label to print when selected. This button may be selected as often as the user likes.

The hidden frame contains the actual shipping label that includes the actual postage indicia. The second print button may be selected only a certain number of times such as twice. When first pressed, the user is prompted to determine whether the label was successfully printed. If not, the user is given one more chance. The success or failure of the print step is logged. After two failed print attempts, the user is offered a refund.

In an alternative, the sample postage may be nearly identical to the actual postage. The bar code portion of the indicia may include the actual indicia, but may be clearly marked as a sample or obscured in some way so as to not be machine-readable. For example, a sufficient amount of the barcode could be obscured so that it may not be read even using redundancy features of the barcode.

The web page accessed by the customer may use embedded logic such as that available by using JavaScript, Active Server Pages (ASP) or other similar technology. The system includes a postage broker system that authenticates the postage customer and a postage provider data center wherein the postage broker requests postage from the postage provider data center. The postage provider data center maintains postage meters licensed to the postage broker for use in the brokered postage transactions. The postage broker system responds to a postage customer request for postage.

In fulfilling the postage/shipping label request, the postage broker requests postage from the postage provider data center. The postage broker receives the actual postage label data and a sample postage indicia from the postage provider (assuming the transaction parameters are met). The label data may include indicia data (such as the data that is used to constitute the IBIP barcode) that may be sample data or actual data depending on the version of the label. The label data may include a link to a label image, or the image file itself.

The postage broker then uses the received label data to render a shipping label in a markup language file format to be displayed to a user as the shipping label. The markup file includes a link to a postage indicia generated by a separately located server at the postage provider data center. In an alternative, the CLICKSTAMP™ Online (CSO) system virtual postage meter server hosts the postage indicia. Alternatively, the postage provider sends the entire postage indicia to the postage broker directly.

In another alternative embodiment, the CSO system infrastructure is used to host the label, but in another embodiment the front-end postage brokerage infrastructure hosts the label. In other alternatives, the label may be hosted using a separate server.

In a further illustrative embodiment, the postage provider sends indicia data to the postage broker. The postage broker then constructs a shipping label including the postage indicia barcode, tracking barcode and other information.

Figure 1:
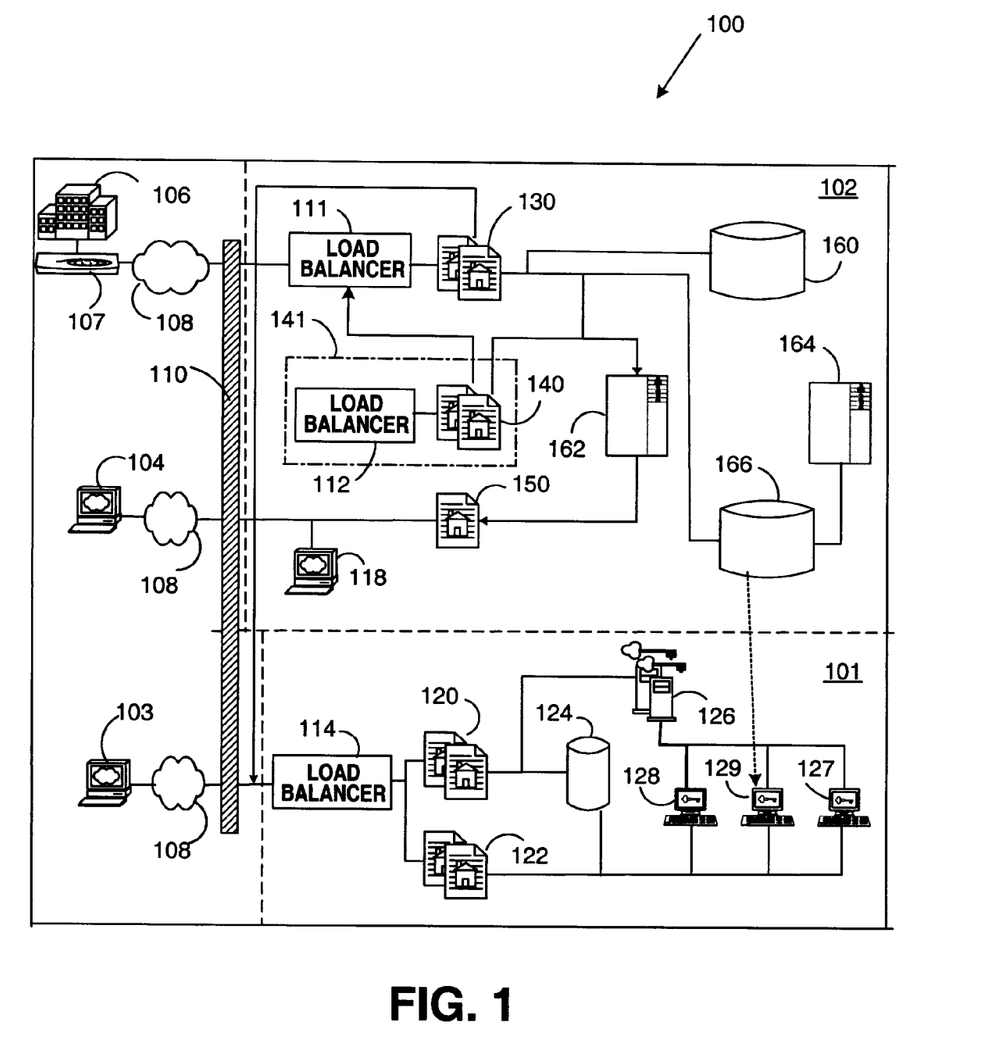
FIG. 1 is a schematic representation of a postage dispensing system according to an illustrative embodiment of the present application.
Figure 2:
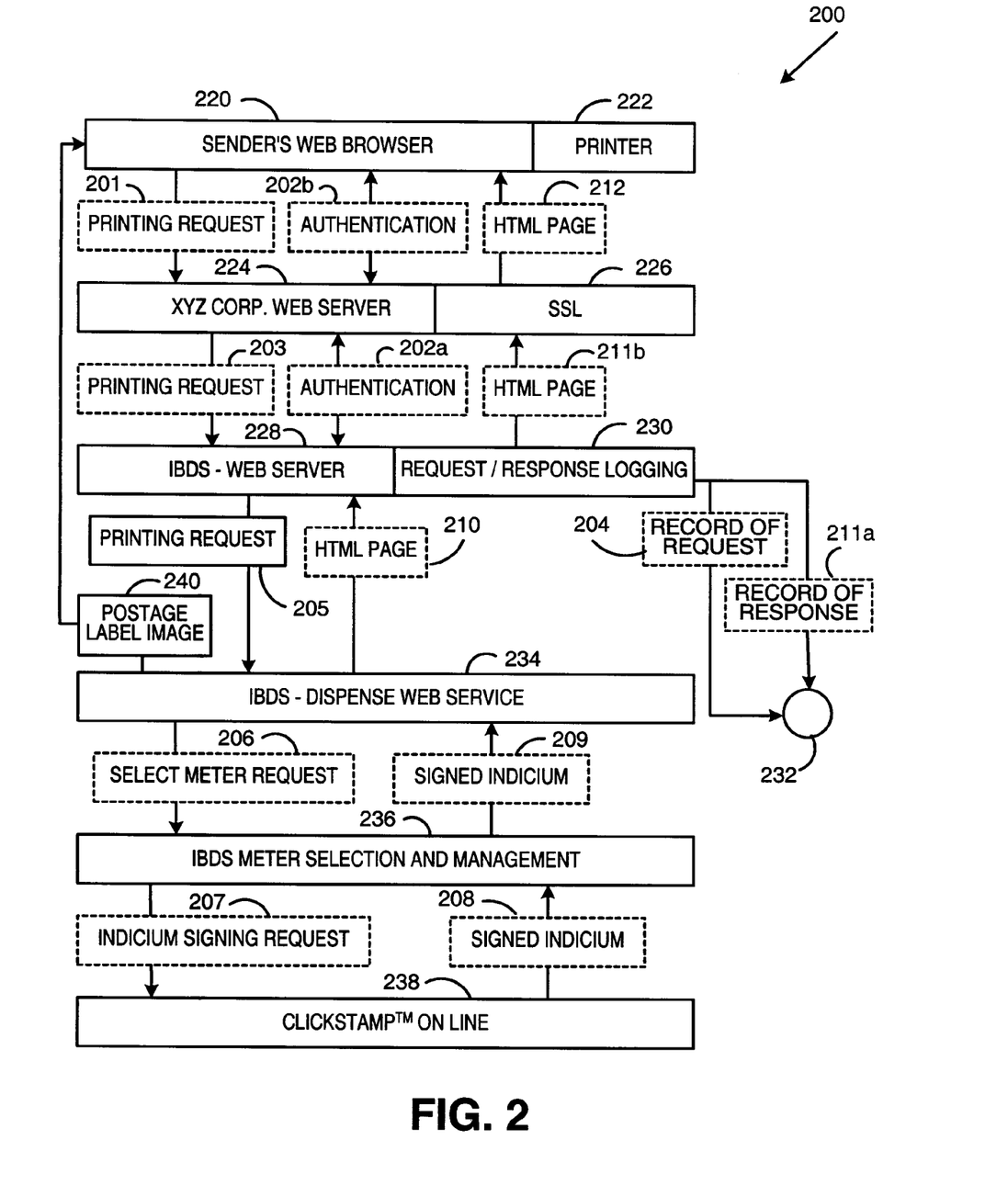
FIG. 2 is a schematic diagram representation of a postage dispensing transaction according to an illustrative embodiment of the present application.
Figure 3:
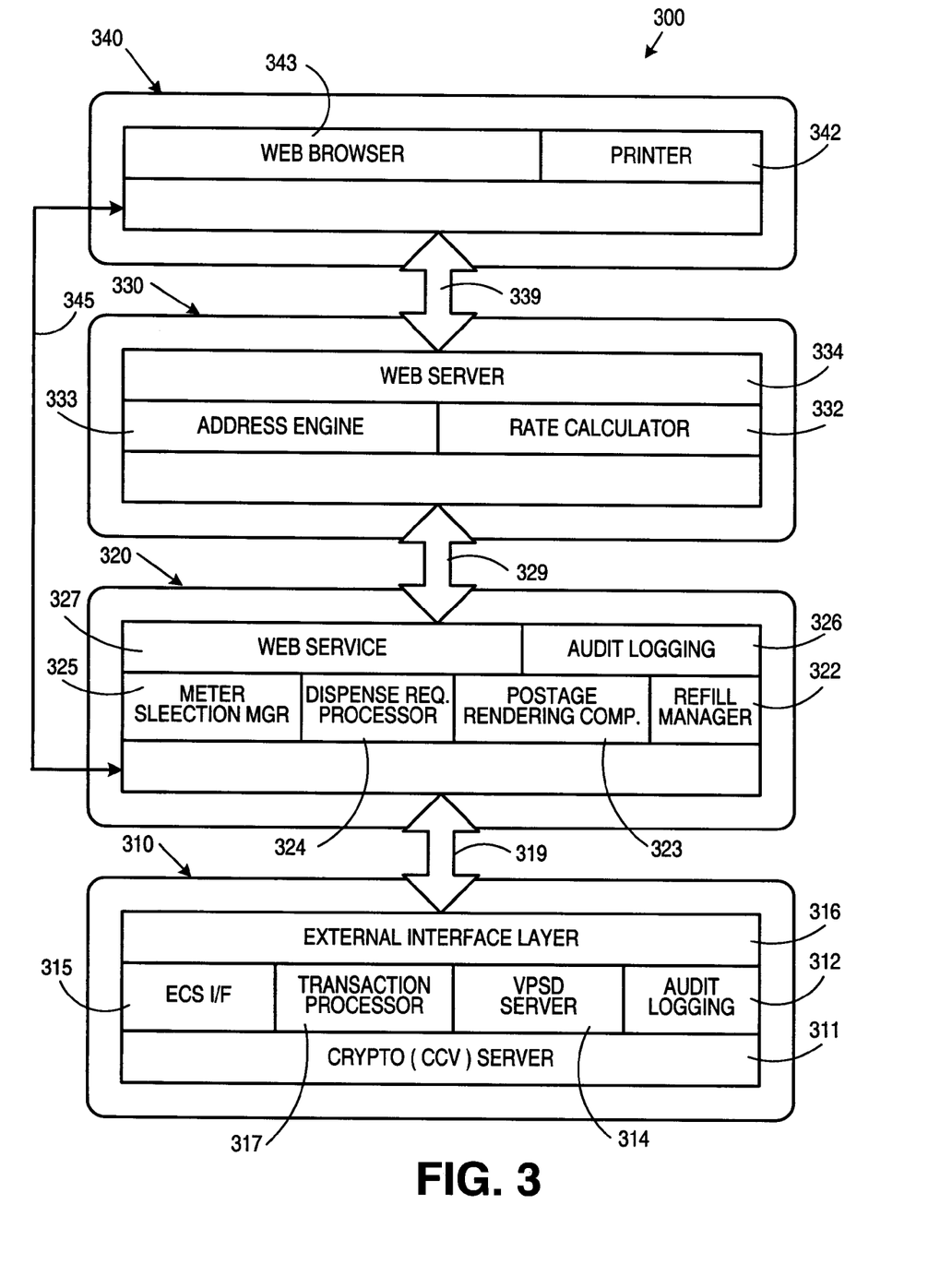
FIG. 3 is a schematic representation of the logical components of the illustrative postage dispensing system and the secure data flow according to the illustrative embodiment shown in FIG. 1.

Referring to FIGS. 1-3, an illustrative infrastructure for printing shipping labels with postage for users in an open postage meter environment is described. Under the present invention, the end user is not required to have a USPS postage meter license.

Referring to FIG. 1, a system schematic diagram of an illustrative shipping and/or postage label processing system 100 according to an illustrative embodiment of the present application is described.

An illustrative e-commerce company xyz Co. 106 wishes to provide postage and/or shipping labels to its customers. The company 106 intends to act as a postage broker for its customers. The company 106 has a connection 107 to the Internet 108 and may communicate with its customers using the Internet or other communications channels. The schematic is illustrative and a typical configuration would include several postage broker companies 106.

A postage provider company has a firewall 110 that filters Internet communications with systems from outside the company. A traditional virtual meter postage system includes an online Internet postage metering system environment 101, such as the CSO having production redundant servers 120, and 122, key management server 126, meter account database 124 and load balanced by system 114.

A traditional heavy client CSO user 103 communicates through the firewall 110 to the traditional CSO environment 101 through a load balancer 114. Several CSO transaction servers 120 communicate with the CSO database 124 and the CSO CCV (Crypto Coprocessor for a Virtual PSD) servers 126 using internal communications channels. The CSO database 124 is a database system available from ORACLE® and it uses RAID storage techniques. Several report and administrative servers 122 communicate with the CSO database 124, an administrator console 128, an Electronic Commerce Server (ECS) console 129 and a Remote Cash Box (RCB) terminal 127. The RCB terminal 127 is a cryptographic engine that is physically secured and ensures that messages that approve postage refills are securely tied to mechanism that obtains funds and pays the Postal Authority. The ECS console 129 provides administration of the electronic commerce front-end using a Broadvision® platform.

An IBDS™ (Internet Based Delivery System) environment 102 provides a new front end to the traditional CSO environment 101. The IBDS Web servers 130 are connected to the external brokers 106 using a load balancer 111. The IBDS Web servers 130 are connected to the front end of the traditional CSO load balancer 114. The IBDS environment 102 includes a database 160 and a data-logging server 162.

The IBDS environment 102 includes IBDS Administrative server 164 that is used to instantiate new postage broker accounts and meters. The administrative server 164 is not accessible using the Internet. The IBDS Administrative server 164 provides functions including a meter setup tool that allows new CSO meter records to be created for a new postage broker 106. Additionally, the administrative server 164 provides a meter refill manager, an audit utility and fraud alerting system. Similarly, IBDS Administration server 164 provides additional status systems to monitor system performance and operational status.

The IBDS environment 102 allows a United States Postal Service (USPS) Officer system 104 to have access through the firewall 110. The IBDS environment 102 includes a help desk system 118 and an internal USPS Customer Service Representative (CSR) web server 150.

The IBDS environment 102 includes an IBDS Database 166 that communicates with the ECS console 129 of the traditional CSO environment 101. The IBDS Database 166 is a MICROSOFT®SQL Server 2000 cluster running on a platform such as WINDOWS® 2000 Advanced Server using RAID technology.

The IBDS environment 102 allows one or more external postage brokers such as xyz Co. 106 to have access to the IBDS web servers 130. The postage brokers 106 may broker postage to customers and provide access to shipping services by providing a shipping label with tracking number and optional special services. Similarly, the postage broker may use the system for its internal postage and shipping needs. It will be understood that broker 106 may be the same entity that operates the IBDS environment 102.

Postage dispensing systems may be subject to fraud attacks. The systems described in the illustrative embodiments herein have several pieces of data available that may be logged and used for fraud detection purposes. For example, each digitally signed request for postage received from the broker is logged. Additionally, all requests/transactions are logged. The system also maintains a list of successful shipping label/postage indicia prints and logs unsuccessful print attempts and refund requests. The fraud detection mechanism detects anomalies in the logged data and is described herein with reference to FIG. 8.

Referring to FIG. 2, a schematic diagram representation of an illustrative postage dispensing transaction 200 according to an illustrative embodiment of the present application is described.

A parcel shipper uses a sender's web browser 220 to send a printing request 201 to the postage broker web server 224. The sender's web browser 220 and postage broker server 224 perform authentication 202b. The postage broker server 224 sends a printing request 203 to the IBDS server 228. The postage broker server 224 and the IBDS server 228 perform authentication 202a.

The IBDS server 228 sends a printing request 205 to the IBDS web server 234. The request/response logging function 230 then sends a record of request 204 to the logging server 232.

IBDS web server 234 sends a select meter request 206 to the IBDS meter selection and management system 236. The IBDS meter selection and management system 236 sends an indicium signing request 207 to the CSO environment 238 (shown in FIG. 1 as 101). A signed indicium is sent 208 to the IBDS meter selection and management system 236 and then sent 209 to the IBDS dispense system 234, which then sends an HTML page 210 to the IBDS web server 228. The request/response logging function 230 then sends a record of response 211a to the logging server 232. Postage label image 240 is sent from web service 234 to web browser 220.

The HTML page is sent 211b to the broker web server 224 using a secure channel 226 and then may be optionally modified before being sent 212 to the sender's web browser 220. For example, the broker may brand the page using broker graphics. The HTML page may contain the label image 240 or may contain a link to a postage label image 240 stored on the IBDS dispense web server 234. The user then prints the HTML page using printer 222 or retrieves the postage label image from the link and then prints.

The IBDS system comprises an authentication process that includes passing a printing request 203 that includes a unique ID that identifies a specific postage broker with an identifier that identifies a specific customer of the postage broker. Any other known authentication process may be used. Additionally, a transaction ID that identifies a specific transaction is included. The transaction ID is unique for each request coming from one postage broker. A digital signature including a signature of the three authentication elements may be used. When the request reaches the IBDS server 228, the server performs a series of validity checks before executing the request. If any of the checks fail, the IBDS server 228 will reject the request and send an error message to the postage broker server 224. The checks may include checking the request for valid parameters including a Security header, the broker ID, a Login ID, a non-empty Login ID, a Transaction ID, a Transaction ID that is new. The request may also be checked for a digital signature of the data in the request and a valid digital signature.

Referring to FIG. 3, a security model according to an illustrative embodiment of the present application is described.

The customer system 340 includes a computer having a web browser 343 that includes a secure communications subsystem that supports SSL/TLS. Additionally, a printer 342 is available for printing shipping labels.

The customer system utilizes an Internet connection using SSL/TLS 339 to communicate with a postage broker system 330 of xyz Co. The broker system 330 includes a web server 334 that serves HTML or other markup language files in response to requests from user systems 340. Optionally, a postage broker application includes an address engine 333 that is used for address cleansing and a postage and/or shipping rate calculator 332 that is used to rate package shipping charges. The broker system 330 utilizes an Internet connection using a VPN 329 or other secure channel to communicate with IBDS system 320.

The IBDS system 320 is used to interface with a traditional virtual meter system 310. IBDS system 320 includes a web service 327 that communicates with the postage broker system 330 using VPN connection 329. The IBDS system 320 also includes an audit logging system 326 for logging print success and other information.

The IBDS system 320 includes a meter selection manager 325. In traditional virtual postage meter systems, a user accesses the same meter account for each transaction. Here, a postage broker may have one or more virtual postage meter accounts. The meter selection manager 325 is used to select the virtual postage meter account that will be utilized for a particular transaction. In one embodiment, if the postage broker has more than one meter account, the virtual postage meter account with the highest balance is selected. In another embodiment, the entire balance of one virtual postage meter account is exhausted before proceeding to the next such that a smaller set of meters would need to be refilled. Furthermore, known systems for choosing the refill amount can be utilized such as those described in commonly owned, copending U.S. patent application Ser. No. 09/952,543, filed Sep. 14, 2001 and entitled Method And System For Optimizing Refill Amount For Automatic Refill Of A Shared Virtual Postal Meter, incorporated herein by reference.

The postage provider system 320 includes a postage refill manager system 322 that manages the meter refill process for each postage broker.

The postage provider system 320 includes a postage dispense request processor 324 that processes postage requests. Additionally, a postage-rendering component 323 renders an image or other data file for inclusion in the shipping label. The rendered postage may include an IBIP indicium. As described herein, the postage-rendering component may render a sample indicium and an actual indicium. Optionally, the postage rendering component may reside within the postage broker system 330. The postage provider system 320 communicates with the traditional virtual postage system 310 using the SSL protocol over network 319. Alternatively, other network topologies and security configurations may be utilized. For example, mutually authenticated SSL may be used. Additionally, an actual private network such as a dedicated line may be utilized.

The traditional virtual postage system 310 is preferably a CSO system 310. The virtual postage system 310 includes an external interface layer 316 that interfaces with traditional CSO users and the IBDS postage users. The system includes a transaction processor 317, a Virtual Postal Security Device (VPSD) server 314 and an Electronic Commerce Server (ECS) IF 315. The system includes an audit logging system 312 and a crypto coprocessor for virtual PSD (CCV) server 311. Web browser 343 is connected to web service 327 using secure link 345.

The systems and subsystems here may be organized as different portions of an application, different applications on a computer or even different applications running on different computers. Similarly, any combination may be used or any known form of geographical, throughput or other load balancing may be used.

Referring to FIGS. 4-7, an illustrative system and method for preventing duplicate printing in a web browser according to an illustrative embodiment of the present application is described. In the preferred embodiment, the system does not download an application to the user's computer. In an alternative embodiment, a small program such as a Java program with the same functions described below that can be executed in a browser-based virtual machine could be utilized.

Figure 4:
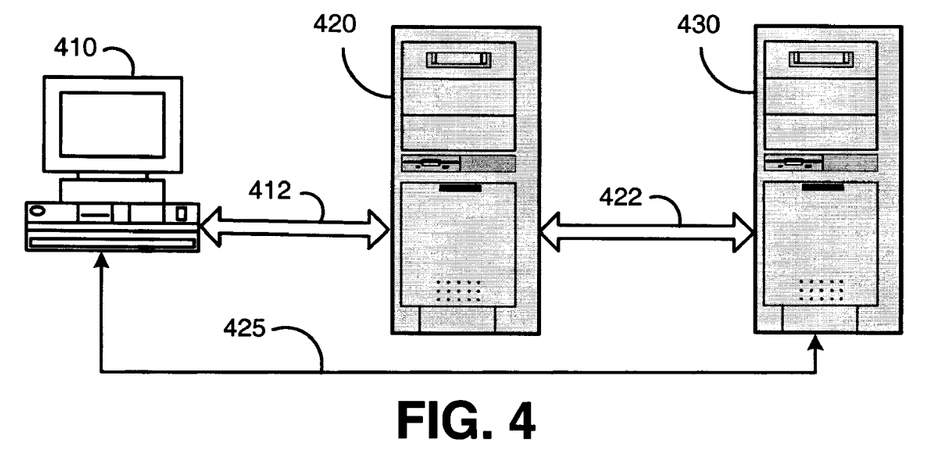
FIG. 4 is a schematic diagram showing a process flow for dispensing shipping labels with postage according to an illustrative embodiment of the present application.

Referring to FIG. 4, an illustrative shipping label/postage dispensing system 400 according to an illustrative embodiment of the present application is shown to illustrate a process flow for dispensing shipping labels with postage.

A shipping customer system 410 is connected to xyz Co. postage broker system 420 using a communications channel 412 such as the Internet. Similarly, the customer system 410 is connected to the IBDS system 430 using a communications channel 425 such as the Internet. System 430 is equivalent to systems 101 and 102 shown in FIG. 1. The Internet connections may be secured using Secure Socket Layer (SSL), Virtual Private Network (VPN) or other technologies.

In a typical transaction, a customer logs into a vendor site such as an auction e-commerce provider. The customer may be authenticated by the methods that the e-commerce auction site uses for its auction customers. The customer then initiates a process to purchase postage and to initiate a shipping transaction. A print postage request is sent from the customer system 410 to the xyz Co. system 420. The xyz Co. system 420 then verifies the destination address and calculates the shipping rate. The destination address may be cleansed if required. The xyz Co. system 420 then formulates a postage dispense request for the IBDS system and signs the request with a private key. The xyz Co. system 420 then sends the request to the IBDS system 430.

IBDS system 430 generates an HTML page containing a link to a postage label image and sends the HTML page to XYZ Co. system 420. XYZ Co. system 420 sends the HTML page to the customer system 410. Customer system 410 may then access the postage label image stored on the IBDS system 430 for subsequent printing.

Figure 5:
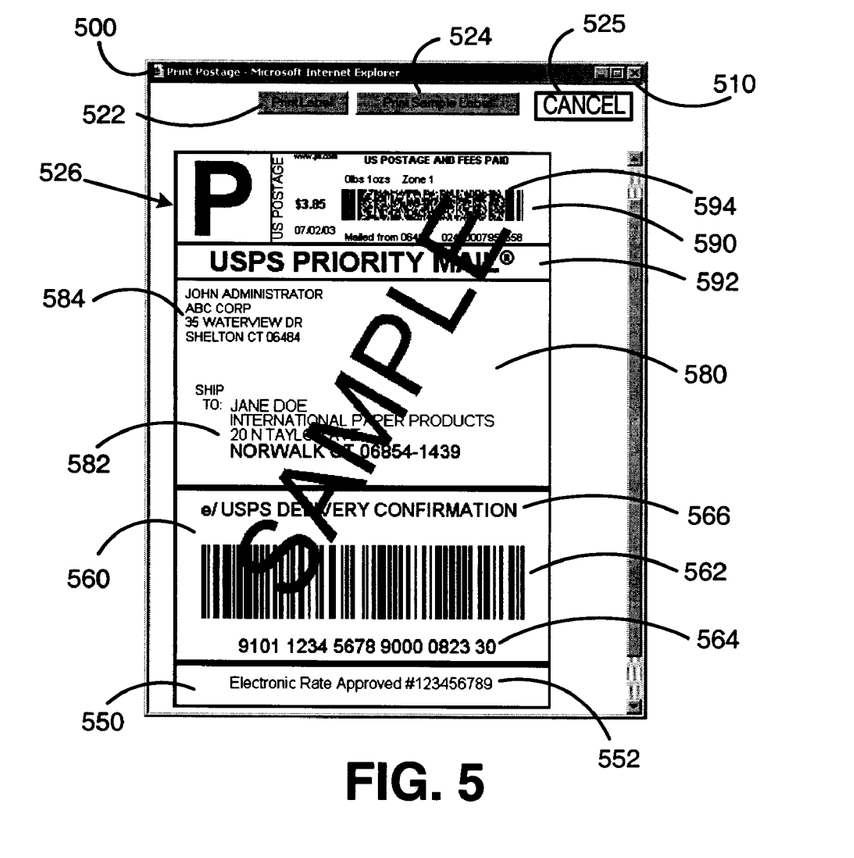
FIG. 5 is a schematic representation of an illustrative shipping label with sample postage according to an illustrative embodiment of the present application.

Referring to FIG. 5, a markup language file representing a postage label file is shown displayed in a browser window

500. The browser pull-down menus 510 and all user control is disabled and invisible. A shipping/postage label print button 522 is placed in the top of the browser window 500. A postage transaction cancel button 525 is provided and a sample shipping/postage label print button 524 is provided. The shipping/postage label 526 includes a top section 590 that includes an indicator of the class of service 592 and a sample indicium barcode 594. The label 526 includes a second section 580 that includes destination 582 and source 584 address information. The label 526 includes a third section 560 that includes a delivery confirmation barcode 562 and a delivery confirmation number in human readable form 564. A human readable designation of any special service is provided 566. The label 526 also includes a fourth section 550 that includes a human readable approval code 552.

Figure 6:
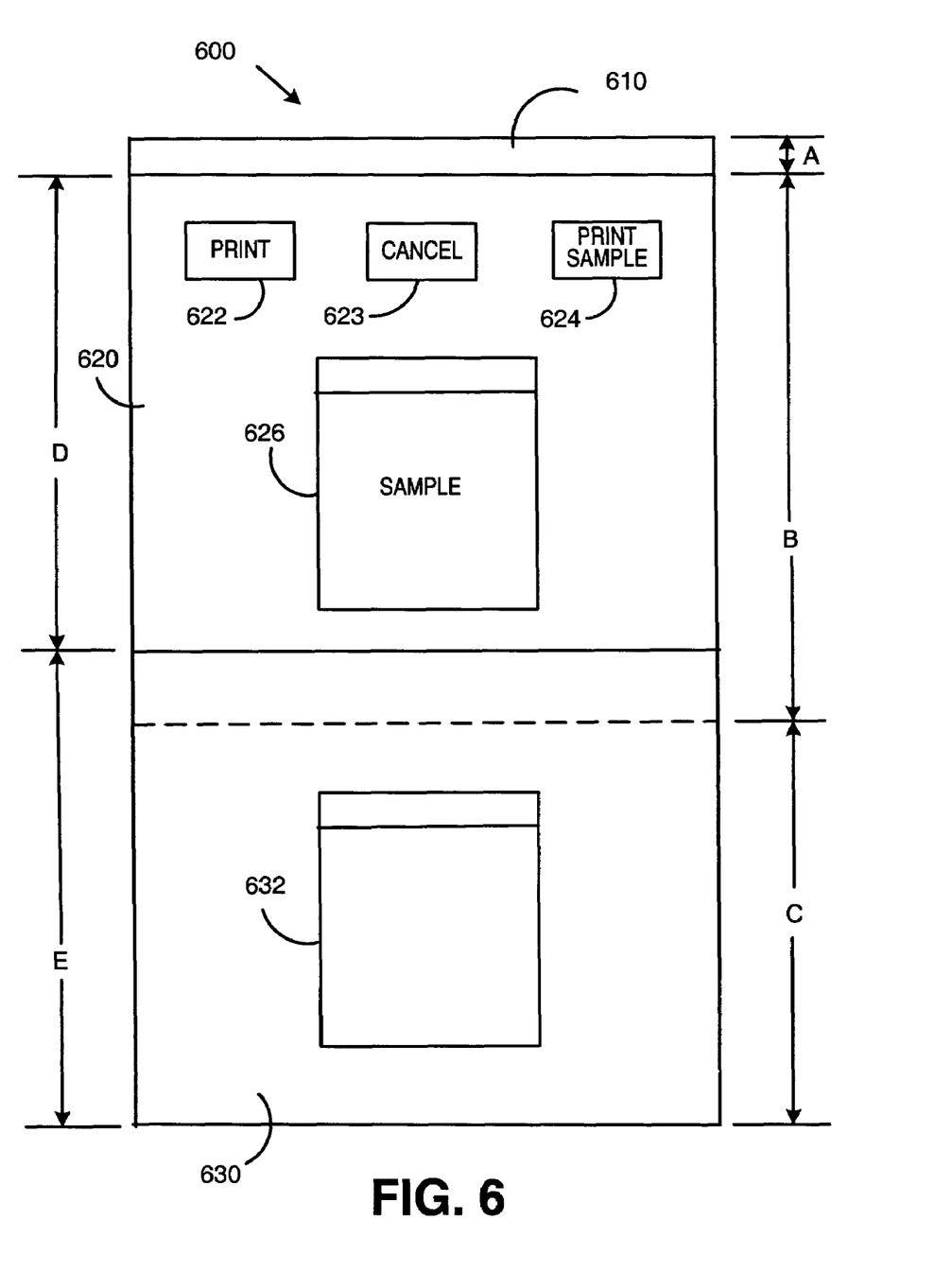
FIG. 6 is a schematic representation of a display showing an illustrative shipping label with sample postage and a hidden shipping label with actual postage according to an illustrative embodiment of the present application.

Referring to FIG. 6, a display showing an illustrative shipping label 600 with sample shipping label 626 and a hidden shipping label 632 with actual postage according to an illustrative embodiment of the present application is described. The browser control bar 610 has height A and is disabled such that the user does not have control of menus, toolbars, scroll bars, and other control functions such as keystroke panning and right click menus.

The visible frame 620 is not resizable and has the height B. The invisible frame 630 has height C. The screen is divided into a visible height D and an invisible height E. Visible frame 620 includes a sample shipping label 626 that is visible. A sample print button 624 and a postage print button 622 are included in the visible frame. In an alternative, frame 620 is a partially visible frame.

The invisible or hidden frame 630 includes the actual shipping label 632 that is to be printed. The logic behind print button 622 causes the hidden frame 630 having shipping label 632 to be printed. The print button 622 logic prompts the user to answer whether the print was successful. If the user does not reply, the default is an affirmative answer. If the user indicates that the print was not successful, the user is offered the opportunity to reprint once. Alternatively, the number of print retries could be varied. As described herein, the print button 622 logic also logs the indication of success and/or failure to the postage provider system 430 for fraud detection and other purposes such as tracking.

Since the actual and sample shipping label files may be stored in a GIF format, the files may be large. The files can be stored on the IBDS system and referenced in the HTML or other markup language page that is sent to the customer. Such a configuration provides greater throughput having a low time to first byte (TTFB). Additionally, less data is transferred between the xyz Co. system and the IBDS server. More data is transferred between each customer system and the IBDS system, but that data is distributed over the various channels that each customer uses to reach the IBDS system. As soon as the customer responds to the successful print prompt (either answer or a default) the label images are removed from the server. If no response is received, then the label GIFs are removed after 5 minutes. Alternatively, another default time period such as 10 minutes may be used.

Alternatively, other file formats may be utilized. The client may render the image of the label using an HTML or other link to include an image or image portions that are in different formats such as BMP, TIFF, JPEG, PIX, PNG, and PCX.

Alternatively, the buttons 622, 624 could be included in a blank portion of the invisible frame 630. For example, a portion of the invisible frame 630 would actually be visible and contain the buttons. Accordingly, when a user selected the print buttons, the invisible frame would be the active frame and cross-frame control by the buttons would not be required.

In another alternative, the print button logic can be implemented using Active Server Pages (ASP) or other browser compatible logic such as Macromedia, Jscript, VBScript or other business logic language that is preferably browser independent.

In another alternative, the reprint capability could be provided using a yes/no dialog box that is used to pop-up and prompt the user to reply whether the label printed correctly before the window is scripted to close. If the user indicates that the label did not print correctly, the label will be reprinted. Optionally, a reprint notification will be transmitted to the postage provider server.

In another alternative, the order of the frames may be switched and the hidden information may be overlapped at the top of the screen. Furthermore, additional hidden or visible frames may be added.

The IBDS system may provide templates and/or API to the postage broker for development of the customer pages. Alternatively, the postage broker may design a web page for the end-user's machine that meets the above constraints. The web page to be created in a new browser window on the user's computer has all menus, toolbars, scrollbars and status bars removed from the browser window implementation. Keystroke panning and any other user control such as window resizing is also disabled. Such a browser window is said to be secure as the user is unable to change any of the settings.

A sample label is rendered in a visible frame with a corresponding usable label in a hidden frame. A print button in the visible frame initiates the print dialog box, but the target is the invisible frame. After printing the window is scripted to close.

Figure 7:
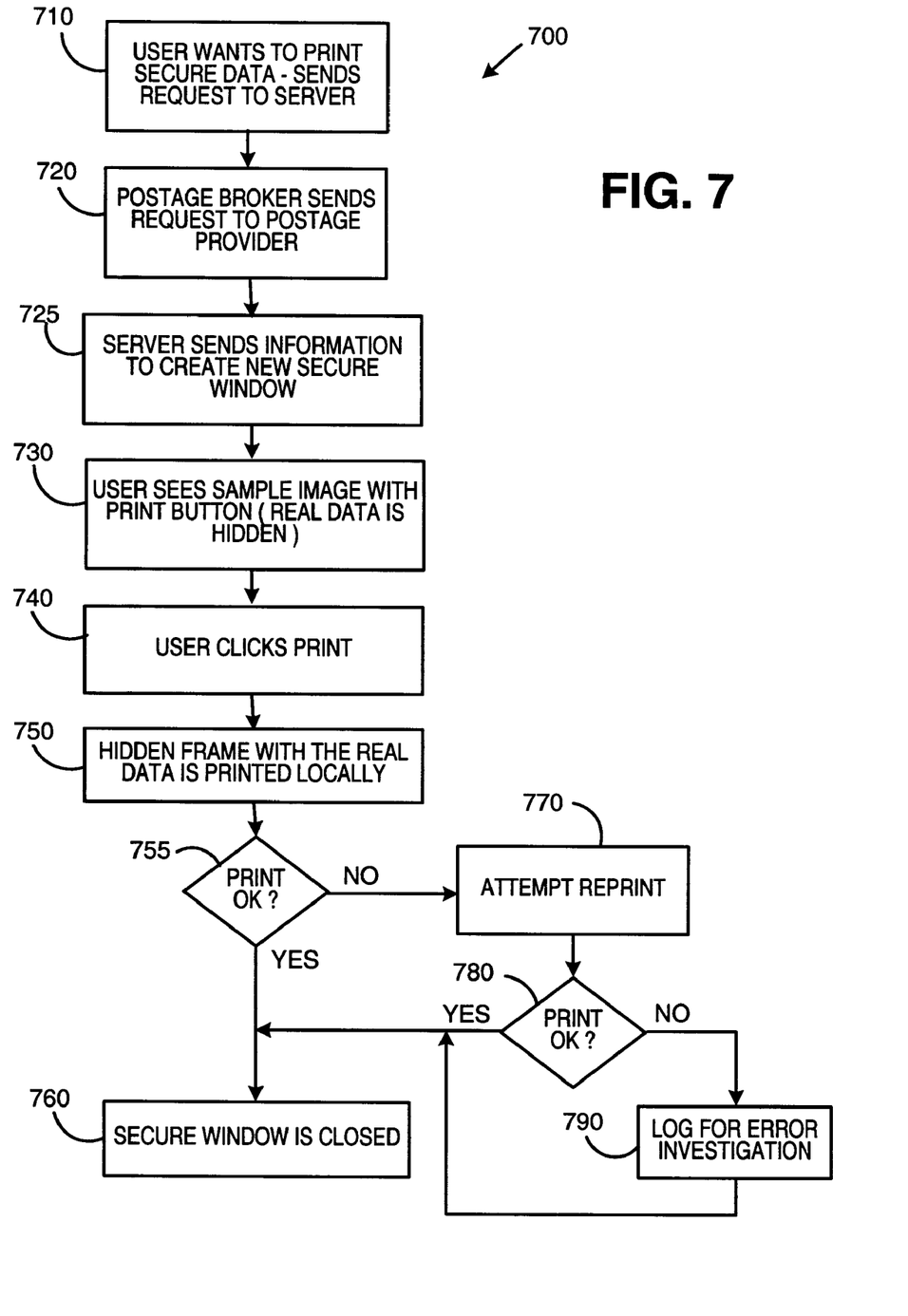
FIG. 7 is a flow chart showing a process for dispensing a shipping label with postage according to an illustrative embodiment of the present application.

Referring to FIG. 7, a method for printing a shipping label with postage 700 according to an illustrative embodiment of the present application is described.

In step 710, the user, through shipping customer system 410 indicates a desire to print a shipping/postage label to a postage broker system 420. In step 720, the postage broker system 420 sends a request to the IBDS system 430 after authenticating the user. In step 725, the IBDS system 430 provides the data required to create a new secure window having a postage indicia. This information may be sent directly to the user or to the postage broker and then forwarded to the user. In step 730, the user computer 410 renders a new secure browser window having a visible frame and print buttons as described herein and wherein the real image is hidden. In step 740, the user selects the print button. In step 750, the JavaScript code prints the actual shipping label with postage from the hidden frame. In step 755, the user indicates whether or not the shipping label with postage printed legibly. If yes, the secure window is closed in step 760.

If the user indicates that the label did not print properly, another attempt to print the label is made at step 770. At step 780, the user indicates whether or not the reprint attempt was successful. If yes, the secure window is closed at step 760. If no, an error is logged and the problem investigated at step 790. The secure window is then closed at step 760.

In an alternative, the secure window is available only for a period of time such as five minutes.

The URI, URL or other identifier used to locate the label or label data may include a relatively long URL so that it could not be guessed in a reasonable amount of time. In an alternative, a session identifier or other known user access scheme may be used to password protect the URL location that is hosting the label. In one embodiment, the label is hosted in a GIF file that is not encrypted. Accordingly, as long as the GIF is publicly available for a short time using a URL that is long and difficult to guess, the user information (e.g., name and address) should not be vulnerable.

Alternatively, the GIF may be made available to only requests coming from certain IP Addresses. For example, the IP Addresses from which all requests are received would be logged. Accordingly, if an unreasonable number of requests were received from a single IP address, that IP Address could be identified as a hostile IP Address being used by someone fishing for labels. Such addresses could be denied access. Additionally, should an attacker poll an unreasonable number of label address that do not exist (one may be unreasonable), that IP Address could be logged, locked out and later investigated for potential fraud.

A dispense postage function request includes a postage broker identifier, a transaction identifier and a message signature. Here, the combination of postage broker identifier and transaction identifier should be unique over at least a certain time period. For example, in an online auction environment, an auction transaction identifier could be used as the postage request transaction identifier so that the underlying transaction and the postage transaction are associated.

Figure 8:
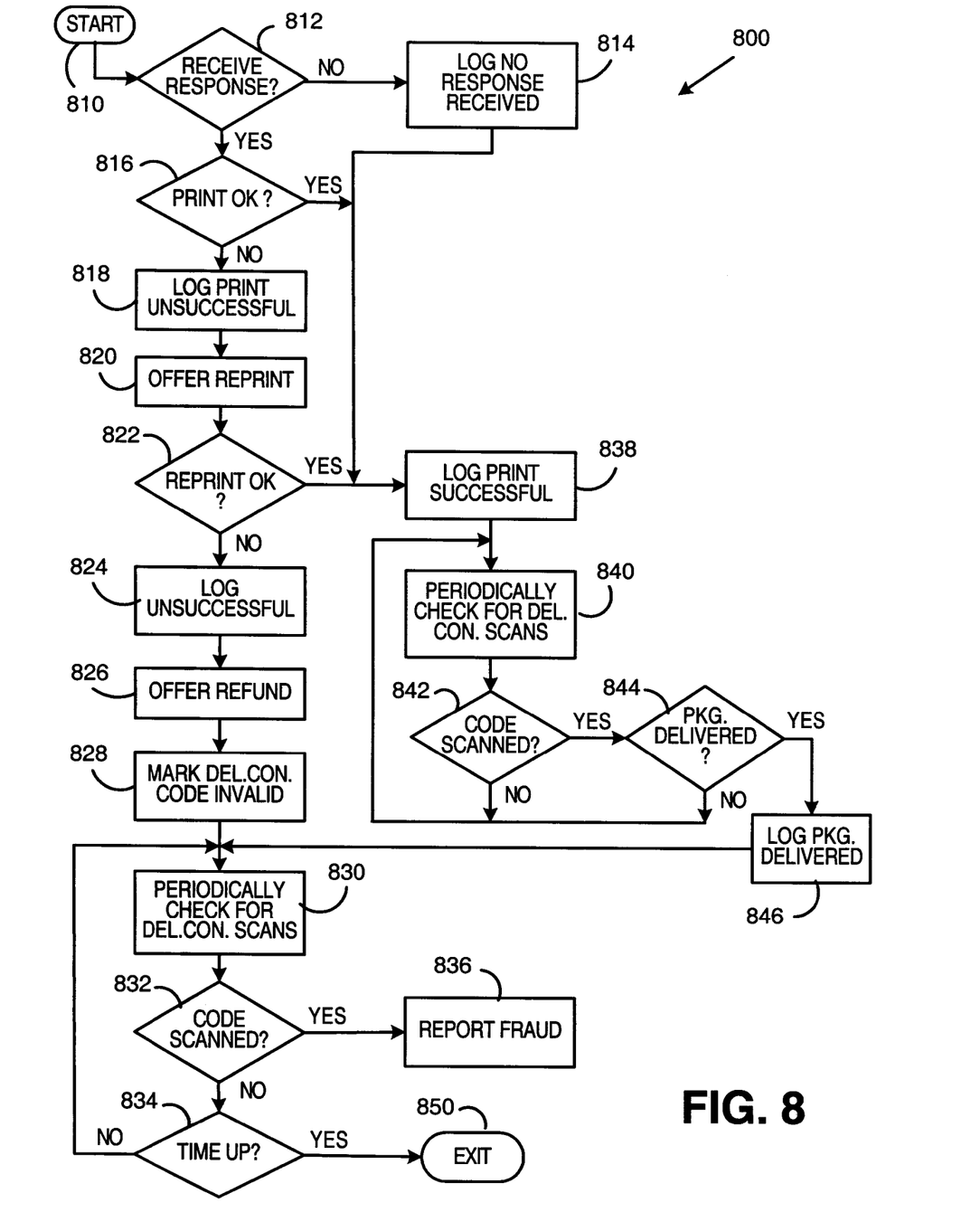
FIG. 8 is a flow chart showing a process for logging print data and calculating a fraud flag ratio according to an illustrative embodiment of the present application.

Referring to FIG. 8, a process for logging print data and calculating a fraud flag ratio according to an illustrative embodiment of the present application is shown. In one embodiment, a customer could be trusted not to commit fraud in a refund request. For example, if the postage label printed incorrectly twice, the customer would be charged for postage that was not used. The customer would then have to request a postage refund. However, in a preferred embodiment, tracking information is used in determining whether to honor a refund request. Alternatively, the refund request may be honored and data collected for later use to detect any fraud.

The fraud detection process starts in step 810. In step 812, the process determines if it has received a print outcome response from the end user browser in the allotted amount of time. If not, the process proceeds to step 814 and logs the default response that notes that no response was received, but proceeds to step 838 to log a default print successful indication. If a response was received, the process proceeds to step 816. In step 816, the process determines if the print was successful. If so, the process also proceeds to step 838 to log a successful print. If the indication shows that the print was not successful, the process proceeds to step 818 and logs the unsuccessful print attempt. In step 820, the process offers the user a chance to reprint the shipping label.

In step 822, the process again polls the user in order to determine whether the reprint was successful.

The above embodiments have been described using postage dispensing as an illustrative application. In alternative embodiments, the embodiments described herein may be used to control the printing of items of such as tickets and other items of value. Furthermore, articles and reports with controlled distribution may be dispensed using embodiments described herein. Documents of value such as a ticket, receipt, article, report, financial instrument and contract can be controlled. Additionally, the sample and actual frames do not necessarily require including the same item or information. For example, an article abstract could be sent to a visible frame and the entire article could be sent to the non-viewable frame portion to be printed only if purchased.

Co-pending, commonly owned U.S. patent application Ser. No. 10/707,509 filed herewith, is entitled Fraud Detection for Postage Systems and is incorporated herein by reference in its entirety.

Co-pending, commonly owned U.S. patent application Ser. No. 10/707,510 filed herewith, is entitled Systems and Methods for Facilitating Refunds of Unused Postage and is incorporated herein by reference in its entirety.

The present application describes illustrative embodiments of a system and method for providing funds accounting including postage brokerage, payment and fraud detection. The embodiments are illustrative and not intended to present an exhaustive list of possible configurations. Where alternative elements are described, they are understood to fully describe alternative embodiments without repeating common elements whether or not expressly stated to so relate. Similarly, alternatives described for elements used in more than one embodiment are understood to describe alternative embodiments for each of the described embodiments having that element.

The described embodiments are illustrative and the above description may indicate to those skilled in the art additional ways in which the principles of this invention may be used without departing from the spirit of the invention. Accordingly, the scope of each of the claims is not to be limited by the particular embodiments described.

The invention claimed is:

1. A method for deterring duplicate printing of a first image comprising:
    receiving a request relating to the first image from a client system;
    providing data to the client system for forming at least a portion of a sample image to a portion of a program display window in the client system that is visible to the user, wherein the sample image is of a similar type as the first image;
    providing data to the client system for forming at least a portion of the first image to a portion of the client system program display window that is not visible to the user;
    receiving an indication of a print request relating to the first image;
    determining whether a threshold of print failures has been reached; and
    providing an indication that the print request is invalid after the threshold of print failures has been reached.

2. The method of claim 1 wherein:
    the first image comprises a shipping label having a postage indicia comprising a postage indicia code;
    the sample image comprises a sample shipping label having a sample postage indicia;
    the client system comprises a web browser application;
    the web browser application provides a visible portion of a page for displaying a first frame including the sample image;
    the web browser application provides a non visible portion of the page for receiving a second frame including the first image; and
    the data provided to the client system program is provided by a first web server.

3. The method of claim 2, wherein the sample shipping label includes a sample indicator and wherein the web browser application automatically closes the display window within a first period of time after the display window is launched.

4. The method of claim 2, further comprising:
providing formatting instructions to the client system, wherein
the formatting instructions prevent user access to the second frame.

5. The method of claim 1 further comprising:
providing formatting instructions to the client system, wherein
the formatting instructions prevent user access to a non-visible portion of the client system program window.

6. The method of claim 3 wherein:
the sample image is an image file using an image file format selected from the group: GIF, BMP, TIFF, JPEG, PIX, PNG and PCX; and
the sample indicator comprises an indication to the user that the label is not valid for postage.

7. The method of claim 3 wherein:
the sample indicator comprises an overlay for obscuring the postage indicia of the sample label.

8. The method of claim 2 wherein:
the sample image has the same dimensions as the first image.

9. The method of claim 1 wherein:
the sample image comprises the first image and a superimposed sample indicator.

10. The method of claim 1 further comprising:
providing a first logic indicator in the visible portion of the client system program window for receiving an indication of a sample print request associated with the sample image; and
providing a second logic indicator in the visible portion of the client system program window for receiving an indication of a non-sample print request associated with the first image.

11. The method of claim 10 further comprising:
receiving at least one print success indicator from a user indicating whether the non-sample print request was successful.

12. The method of claim 11 further comprising:
determining whether the received at least one print success indicator indicates that a threshold of print failures has been reached; and
if the threshold of print failures has been reached, providing an indication that the print request is invalid.

13. The method of claim 12 wherein:
the first logic indicator and second logic indicator are presented in a second visible frame.

14. The method of claim 2 wherein:
the first image includes image portions obtained from a second web server; and
the sample image comprises image portions obtained from a second web server.

15. The method of claim 4 wherein
the formatting instructions prevent scrolling and resizing of the client system program window, thereby preventing user access to the second frame.

16. The method of claim 1 wherein:
the first image comprises a document of value;
the sample image comprises a sample document of value;
the client system program comprises a web browser application;
the web browser application provides a visible portion of a page for displaying a first frame including the sample image;
the web browser application provides a non visible portion of the page for receiving a second frame including the first image; and
the data provided to the client system is provided by a first web server.

17. The method of claim 16 wherein
the document of value comprises a document selected from the group: ticket, receipt, article, report, financial instrument and contract.

18. The method of claim 16 wherein the sample image includes a sample indicator.

19. The method of claim 1 wherein:
the first image comprises a document of value;
the sample image comprises an image related to the document of value;
the client system comprises a web browser application;
the web browser application provides a visible portion of a page for displaying a first frame including the sample image;
the web browser application provides a non visible portion of the page for receiving a second frame including the first image; and
the data provided to the client system is provided by a first web server.

20. The method of claim 19 wherein
the sample image is a portion of the document of value.

21. The method of claim 19 wherein
the sample image is an article abstract.

22. The method of claim 1 further comprising:
providing a mechanism to control printing of at least a portion of the client system program display window that is not visible to the user.

23. The method of claim 2 further comprising:
providing a mechanism to control printing of at least a portion of the client system program window that is not visible to the user.

24. The method of claim 16 further comprising:
providing a mechanism to control printing of at least a portion of the client system program window that is not visible to the user.

25. The method of claim 19 further comprising:
providing a mechanism to control printing of at least a portion of the client system program window that is not visible to the user.

* * * * *